US 9,164,261 B2

(12) United States Patent
Ono (10) Patent No.: US 9,164,261 B2
(45) Date of Patent: Oct. 20, 2015

(54) SUPER WIDE ANGLE LENS AND IMAGING APPARATUS

(71) Applicant: FUJIFILM CORPORATION, Tokyo (JP)

(72) Inventor: Kazunori Ono, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/445,088

(22) Filed: Jul. 29, 2014

(65) Prior Publication Data

US 2014/0334020 A1  Nov. 13, 2014

Related U.S. Application Data

(63) Continuation of application No. PCT/JP2013/000516, filed on Jan. 31, 2013.

(30) Foreign Application Priority Data

Feb. 6, 2012  (JP) ................................ 2012-022934

(51) Int. Cl.
*G02B 15/14* (2006.01)
*G02B 9/12* (2006.01)
*G02B 13/04* (2006.01)
*G02B 13/06* (2006.01)

(52) U.S. Cl.
CPC *G02B 13/04* (2013.01); *G02B 9/12* (2013.01); *G02B 13/06* (2013.01)

(58) Field of Classification Search
USPC .................. 359/689, 740, 784, 791
See application file for complete search history.

(56) References Cited

U.S. PATENT DOCUMENTS

| 5,691,851 | A | 11/1997 | Nishio et al. |
|---|---|---|---|
| 2007/0064318 | A1 | 3/2007 | Yagyu et al. |
| 2007/0279759 | A1 | 12/2007 | Hozumi et al. |
| 2011/0304929 | A1 | 12/2011 | Tsutsumi |
| 2012/0147254 | A1 | 6/2012 | Adachi et al. |
| 2012/0314305 | A1 | 12/2012 | Miyagawa |
| 2012/0314306 | A1 | 12/2012 | Sunaga |

FOREIGN PATENT DOCUMENTS

| JP | 7-151973 | 6/1995 |
|---|---|---|
| JP | 2000-56217 | 2/2000 |

(Continued)

OTHER PUBLICATIONS

International Search Report—PCT/JP2013/000516—Jun. 18, 2013.

*Primary Examiner* — Jack Dinh
(74) *Attorney, Agent, or Firm* — Young & Thompson (57) ABSTRACT

This super-wide lens substantially consists of a positive first lens group, a positive second lens group, and a negative third lens group, in this order from the object side. The first lens group and the third lens group are fixed and the second lens group moves toward the object side while focusing from an object at infinity to an object at the closest distance. The first lens group substantially consists of a negative first sub lens group, a positive second sub lens group, an aperture stop, and a positive third sub lens group in this order from the object side. Conditional expressions (1) and (2) are satisfied:

$$0.15 < f1/f2 < 0.60 \quad (1)$$

$$2.5 < f2/f < 7.0 \quad (2), \text{where}$$

f1: the focal length of the first lens group,
f2: the focal length of the second lens group, and
f: the focal length of the entire system when focusing on an object at infinity.

14 Claims, 9 Drawing Sheets

EXAMPLE 1

(56) References Cited

FOREIGN PATENT DOCUMENTS

| | | |
|---|---|---|
| JP | 2004-318108 | 11/2004 |
| JP | 2007-86141 | 4/2007 |
| JP | 2007-327991 | 12/2007 |
| JP | 2010-217506 | 9/2010 |
| JP | 2011-28009 | 2/2011 |
| JP | 2011-128273 | 6/2011 |
| JP | 2011-186269 | 9/2011 |
| JP | 2012-255841 | 12/2012 |
| JP | 2012-255842 | 12/2012 |
| WO | 2011/077716 | 6/2011 |

FIG.4  EXAMPLE 4

SUPER WIDE ANGLE LENS AND IMAGING APPARATUS

CROSS-REFERENCE TO RELATED APPLICATIONS

This application is a Continuation of PCT International Application No. PCT/JP2013/000516 filed on Jan. 31, 2013, which claims priority under 35 U.S.C. §119 (a) to Japanese Patent Application No. 2012-022934 filed on Feb. 6, 2012. Each of the above application (s) is hereby expressly incorporated by reference, in its entirety, into the present application.

BACKGROUND OF THE INVENTION

1. Technical Field

The present invention relates to a super-wide-angle lens and an imaging apparatus, and more particularly to a super-wide-angle lens which can be used for a digital camera, a broadcasting camera, a movie camera, and the like; and an imaging apparatus including the super-wide-angle lens.

2. Description of the Related Art

In recent years, there is great demand for cameras in the above fields to have a small F-number which enables photography in dark places and to have high performance which can be compatible with recent high-definition imaging elements. Moreover, for example, some movie cameras and the like are provided with a mechanism for driving power focus of a focusing group (a lens group which moves while focusing) such as an autofocus mechanism and the like. As there are many opportunities to photograph subjects which are moving, there is demand for a lightweight focusing group and suppression of fluctuations in aberrations and fluctuations in the angle of view in order to have superior responsiveness to focusing when the distance to a subject is changed. Taking these circumstances into consideration, the inner focus lens system is often adopted. Examples of the inner focus lens system include the lens systems disclosed in Japanese Unexamined Patent Publication No. 2011-186269 and Japanese Unexamined Patent Publication No. 2011-028009.

In contrast, many wide angle type lenses for movie cameras are conventionally of the fixed focus type from the viewpoint of optical performance, and are often used by changing a plurality of lenses according to the intended application. For example, the lens disclosed in Japanese Unexamined Patent Publication No. 2000-056217 of a retrofocus type in which a negative first lens group, a positive second lens group, and a positive third lens group are arranged in this order from the object side is known as a wide angle lens.

SUMMARY OF THE INVENTION

However, the lens system disclosed in Japanese Unexamined Patent Publication No. 2011-186269 cannot necessarily be suitable for use in movie cameras because the lens system is mainly designed to be as a projection lens and is a floating focus system that moves two lens groups in different paths, and thereby there is a possibility that the focusing groups will be heavy. The lens system disclosed in Japanese Unexamined Patent Publication No. 2011-028009 is an image acquisition lens, which is mounted on a shape measuring apparatus or a photogrammetry apparatus, which adopts the inner focus lens system that moves the second lens group while focusing and in which fluctuations in aberrations and fluctuations in the angle of view while focusing are not taken into consideration in particular. The lens system disclosed in Japanese Unexamined Patent Publication No. 2000-056217 has a large F-number of 2.8.

The present invention has been developed in view of the above circumstances. It is an object of the present invention to provide a super-wide-angle lens having a smaller F-number and high optical performance, in which reduction in weight of a focusing group is achieved and fluctuations in aberrations and fluctuations in the angle of view during focusing are reduced; and an imaging apparatus equipped with such a super-wide-angle lens.

The super-wide-angle lens of the present invention substantially consists of three lens groups which are a first lens group having positive refractive power, a second lens group having positive refractive power, and a third lens group having negative refractive power arranged in this order from the object side;

the first lens group and the third lens group are fixed and the second lens group is moved toward the object side while focusing from an object at infinity to an object at the closest distance;

the first lens group substantially consists of a first sub lens group having negative refractive power, a second sub lens group having positive refractive power, an aperture stop, and a third sub lens group having positive refractive power in this order from the object side; and conditional expressions (1) and (2) below are satisfied:

$$0.15 < f1/f2 < 0.60 \quad (1)$$

$$2.5 < f2/f < 7.0 \quad (2), \text{where}$$

f1: the focal length of the first lens group
f2: the focal length of the second lens group, and
f: the focal length of the entire system when focusing on an object at infinity.

In the super-wide-angle lens of the present invention, it is preferable for conditional expression (1') below to be satisfied:

$$0.20 < f1/f2 < 0.50 \quad (1').$$

In the super-wide-angle lens of the present invention, it is preferable for conditional expression (2') below to be satisfied:

$$3.0 < f2/f < 6.0 \quad (2').$$

In the super-wide-angle lens of the present invention, it is preferable for the second lens group to substantially consist of a cemented lens formed by cementing a positive lens and a negative lens together.

In the super-wide-angle lens of the present invention, it is preferable for the first sub lens group to include a positive meniscus lens and two negative meniscus lenses; it is preferable for conditional expression (3) below to be satisfied; and it is more preferable for conditional expression (3') to be satisfied instead of conditional expression (3):

$$0.70 < |f1a/f1| < 2.00 \quad (3)$$

$$0.80 < |f1a/f1| < 1.80 \quad (3'), \text{where}$$

f1a: the focal length of the first sub lens group.

In the super-wide-angle lens of the present invention, it is preferable for conditional expression (4) below to be satisfied; and it is more preferable for conditional expression (4') below to be satisfied:

$$-0.50 < f/f1a+b < 0.20 \quad (4)$$

$$-0.40 < f/f1a+b < 0.10 \quad (4'), \text{where}$$

f1a+b: the combined focal length of the first sub lens group and the second sub lens group.

In the super-wide-angle lens of the present invention, it is preferable for the second sub lens group to include two positive lenses; it is preferable for conditional expression (5) below to be satisfied; and it is more preferable for conditional expression (5') to be satisfied instead of conditional expression (5):

$$1.60 < f1b/f < 8.00 \tag{5}$$

$$1.80 < f1b/f < 7.50 \tag{5'}$$

where f1b: the focal length of the second sub lens group.

In the super-wide-angle lens of the present invention, it is preferable for the third sub lens group to substantially consist of a cemented lens formed by cementing a negative lens with a concave surface toward the object side and a positive lens together, and a biconvex lens in this order from the object side; it is also preferable for conditional expression (6) below to be satisfied; and it is more preferable for conditional expression (6') below to be satisfied instead of conditional expression (6):

$$1.70 < f1c/f < 5.00 \tag{6}$$

$$1.90 < f1c/f < 4.00 \tag{6'}$$

where f1c: the focal length of the third sub lens group.

In the super-wide-angle lens of the present invention, it is preferable for the third lens group to include a negative lens having a concave surface toward the image side, of which the absolute value of the radius of curvature of the image side surface is smaller than that of the object side surface, and a cemented lens formed by cementing a biconvex lens and a negative lens together in this order from the object side; it is preferable for conditional expression (7) below to be satisfied; and it is more preferable for conditional expression (7') below to be satisfied instead of conditional expression (7):

$$-15.0 < f3/f < -2.00 \tag{7}$$

$$-12.0 < f3/f < -3.00 \tag{7'}$$

where f3: the focal length of the third lens group.

The imaging apparatus of the present invention is configured to include the super-wide-angle lens of the present invention.

Note that the above expression "lens group" is not necessarily composed of a plurality of lenses, but may also refer to lens groups which are composed of only a single lens.

Note that the expression "substantially" of "substantially consists of . . . " intends to mean that the super-wide-angle lens of the present invention may include lenses substantially without any refractive power; optical elements other than lenses such as aperture stops, cover glasses, filters, and the like; and mechanical components such as lens flanges, lens barrels, imaging elements, and camera shake correction mechanisms; in addition to the constituent elements listed above. The same applies to the other expressions "substantially" described above.

Note that the surface shapes and the signs of the refractive powers of the above lens should be considered in paraxial regions if aspheric surfaces are included therein.

The super-wide-angle lens of the present invention substantially consists of a positive first lens group, a positive second lens group, and a negative third lens group in this order from the object side;

the first lens group substantially consists of a negative first sub lens group, a positive second sub lens group, an aperture stop, a positive third sub lens group in this order from the object side in the lens system which moves the second lens group during focusing; and conditional expressions (1) and (2) are satisfied.

This enables a small F-number, a super wide angle, and high performance of the lens as well as enabling reduction in weight of a focusing group and suppression of fluctuations in aberrations and fluctuations in the angle of view while focusing.

Further, since the imaging apparatus according to the present invention includes the super-wide-angle lens of the present invention, the imaging apparatus allows photography even under low illuminance conditions, can obtain excellent images with a wide angle of view, enables rapid focusing with respect to a subject which is moving, and can reduce fluctuations in performance and fluctuations in the angle of view while focusing.

BRIEF DESCRIPTION OF THE DRAWINGS

A through E of FIG. 5 respectively illustrate aberration diagrams of the super-wide-angle lens according to Example 1 of the present invention.

A through E of FIG. 6 respectively illustrate aberration diagrams of the super-wide-angle lens according to Example 2 of the present invention.

A through E of FIG. 7 respectively illustrate aberration diagrams of the super-wide-angle lens according to Example 3 of the present invention.

A through E of FIG. 8 respectively illustrate aberration diagrams of the super-wide-angle lens according to Example 4 of the present invention.

DESCRIPTION OF THE PREFERRED EMBODIMENTS

Hereinafter, embodiments of the present invention will be described in detail with reference to the accompanying drawings. Each of FIGS. 1 through 4 is a cross-sectional view of the super-wide-angle lens according to the embodiments of the present invention. FIGS. 1 through 4 corresponds to Examples 1 through 4 to be described later, respectively. In FIGS. 1 through 4, the left side is the object side, and the right side is the image side. Each of FIGS. 1 through 4 shows a state focused on an object in infinity. Note that the symbols L11 through L22 and L31 through L33 which are used in FIGS. 1 through 4 are independently applied for each Figure so as to prevent the description from becoming complex due to an increased number of digits of the symbols. Accordingly, even if the same symbol is applied as in other Figures, they do not necessarily represent the same configuration.

The super-wide-angle lens of the present embodiment substantially consists of three lens groups which are a first lens group G1 having positive refractive power, a second lens group G2 having positive refractive power, and a third lens group G3 having negative refractive power arranged in this order from the object side along the optical axis Z. The aperture stop St is disposed within the first lens group G1. Note that the aperture stop St shown in each of FIGS. 1 through 4 does not necessarily represent the size or shape thereof, but the position thereof on the optical axis Z.

Figure 1:
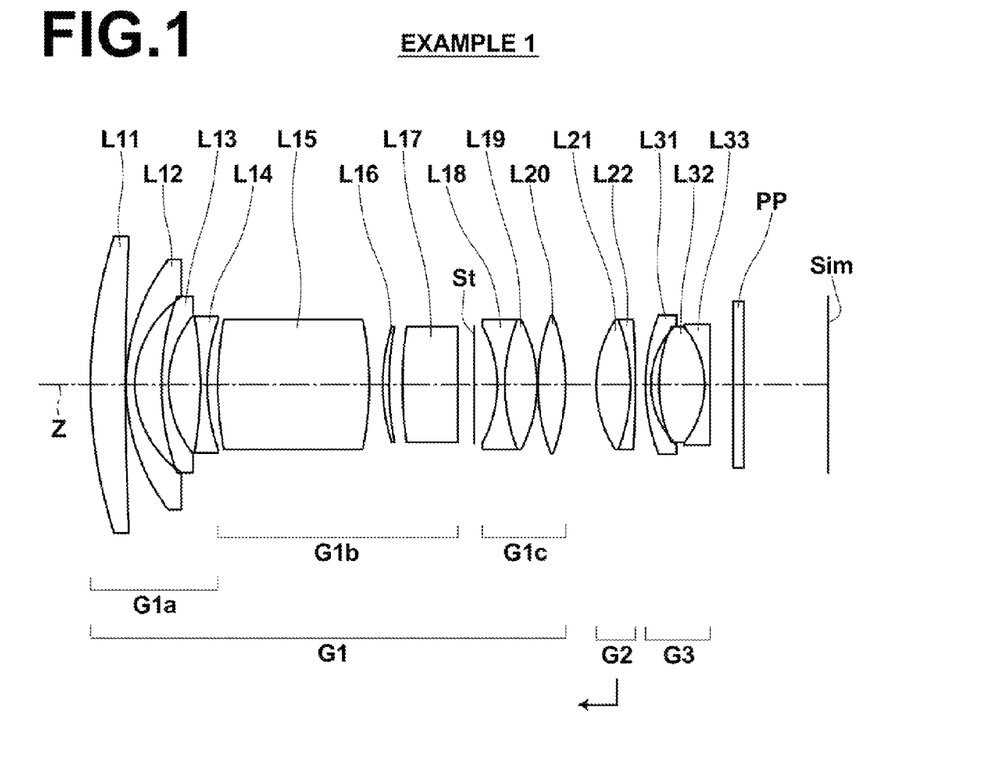
FIG. 1 is a cross-sectional view illustrating the lens configuration of a super-wide-angle lens according to Example 1 of the present invention.

When this super-wide-angle lens is applied to an imaging apparatus, it is preferable for a cover glass, various types of filters, such as an infrared cut filter, a low-pass filter, and the like to be provided between the optical system and the image surface Sim according to the configurations of a camera on which the lens is mounted. FIG. 1 illustrates an example in which a plane parallel optical member PP that presumes such filters is provided between the third lens group G3 and an image surface Sim.

While focusing from an object at infinity to an object at the closest distance, the first lens group G1 and the third lens group G3 are configured to be fixed and the second lens group G2 is configured to move toward the object side. By adopting such an inner focus lens system, reduction in weight of a lens group which moves while focusing and suppression of fluctuations in aberrations during focusing can be achieved, compared to a lens that adopts an entire extending system.

The first lens group G1 substantially consists of a first sub lens group G1a having negative refractive power, a second sub lens group G1b having positive refractive power, an aperture stoop St, a third sub lens group G1c having positive refractive power in this order from the object side. By configuring the first lens group G1 to substantially consist of three sub lens groups which are negative, positive, and positive sub lens groups in this order from the object side; the first lens group G1, the second lens group G2 having positive refractive power which follows thereafter and the third lens group G3 having negative refractive power form a symmetrical configuration with respect to the aperture stop St so that field curvature, distortion, lateral chromatic aberration, and the like can be excellently corrected. This is advantageous from the viewpoint of achieving a super wide angle.

By configuring the third sub lens group G1c which is immediately adjacent to the aperture stop St toward the image side to be a positive lens group, off-axis light rays that exit the aperture stop St can receive an convergence action and enter the second lens group G2, which is a focusing group, in a state where an angle formed by the off-axis light rays and the optical axis Z is smaller. Thereby, fluctuations in the angle of view while focusing can be suppressed. Further, since the second lens group G2 is configured to approach the first lens group G1 while focusing from an object at infinity to an object at the closest distance, the combined focal length of the first lens group G1 and the second lens group G2 becomes appropriately small and the amount that the incident angle formed by the first lens group G1 while focusing on an object at a finite distance is loosened can be canceled. This can suppress fluctuations in the angle of view while focusing.

This super-wide-angle lens is configured to satisfy conditional expressions (1) and (2) below:

$$0.15 < f1/f2 < 0.60 \quad (1)$$

$$2.5 < f2/f < 7.0 \quad (2),\text{ where}$$

f1: the focal length of the first lens group,
f2: the focal length of the second lens group, and
f: the focal length of the entire system when focusing on an object at infinity.

Both in the case that the value of f1/f2 is not more than the lower limit defined by conditional expression (1) and in the case that the value of f1/f2 is not less than the upper limit defined by conditional expression (1), the balance of refractive power between the first lens group G1 and the second lens group G2 will deteriorate and variations in the angle of a light ray which enters an entrance pupil from an object when the object distance is changed will become large. That is, fluctuations in the angle of view will become large. By satisfying conditional expression (1), fluctuations in the angle of view while focusing can be suppressed and be within a permissible range.

If the value of f2/f is not more than the lower limit defined by conditional expression (2), the refractive power of the second lens group G2 which is a focusing group will become too strong, and thereby fluctuations in spherical aberration while focusing will be large. In order to avoid this shortcoming, the number of lenses of the second lens group G2 has to be increased. This, however, will make the focusing group heavier.

If the value of f2/f is not less than the upper limit defined by conditional expression (2), the refractive power of the second lens group G2 which is a focusing group will become weak, and thereby the amount of movement of the second lens group while focusing will be large. Accordingly, the distance between the first lens group G1 and the second lens group G2 has to be widened, and thereby the distance from the aperture stop St to the second lens group G2 will be long. This, however, will increase the lens diameter of the second lens group G2 and will make the focusing group heavier.

It is preferable for this super-wide-angle lens to satisfy one or an arbitrary combination of the configurations described below. It is preferable for the configurations given below to be selectively included as appropriate, according to the items required of the super-wide-angle lens.

It is preferable for the first sub lens group G1a to include one positive meniscus lens and two negative meniscus lenses. By including these three meniscus lenses, it will be easy for the first sub lens group G1a to gradually refract and lead the light rays which have entered at a wide angle of view to the following lens group, while suppressing the amount of occurrence of aberrations. It is desirable for these three meniscus lenses to be arranged in the above-recited order from the object side so that the positive lens is disposed at the most object side where the height of the off-axial light ray from the optical axis Z is the greatest, to secure convergence of the first sub lens group G1a having negative refractive power, and to suppress the occurrence of field curvature and distortion. Further, for this reason, it is preferable for all of the three meniscus lenses to have a shape with a convex surface toward the object side.

Figure 3:
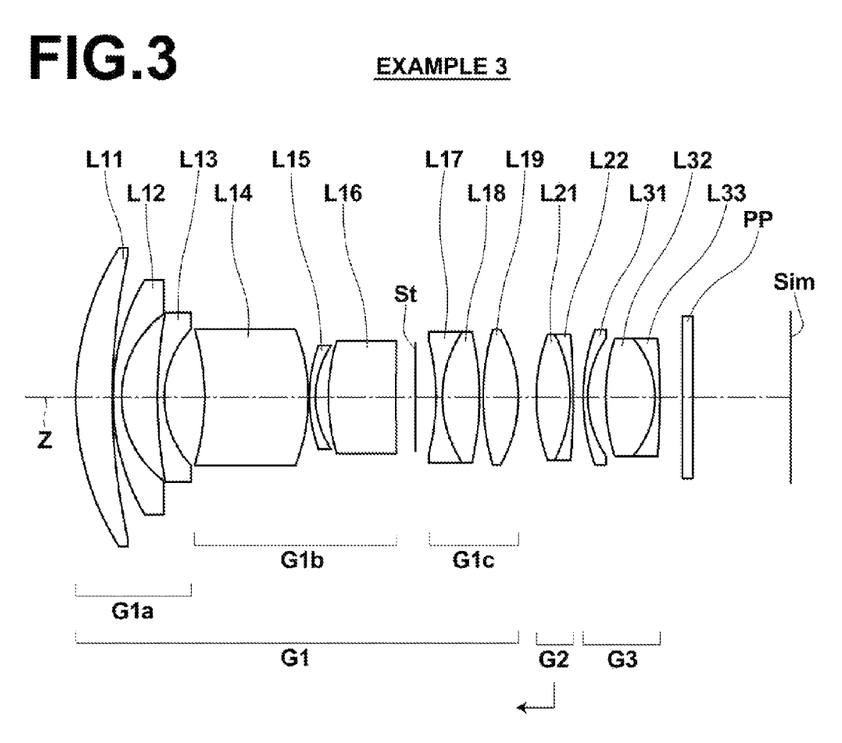
FIG. 3 is a cross-sectional view illustrating the lens configuration of a super-wide-angle lens according to Example 3 of the present invention.

The first sub lens group G1a may be constituted by only these three lenses as shown in the example of FIG. 3. Alternatively, the first sub lens group G1a may be constituted by four lenses in which a biconcave lens is disposed on the image side of these three lenses, as shown in the example of FIG. 1.

More specifically, the first sub lens group G1a shown in the example of FIG. 3 substantially consists of a positive meniscus lens L11 with a convex surface toward the object side, a negative meniscus lens L12 with a convex surface toward the object side, and a negative meniscus lens L13 with a convex surface toward the object side in this order from the object side. The first sub lens group G1a shown in the example of FIG. 1 substantially consists of a positive meniscus lens L11 with a convex surface toward the object side, a negative meniscus lens L12 with a convex surface toward the object side, a negative meniscus lens L13 with a convex surface toward the object side, and a biconcave lens L14 in this order from the object side.

It is preferable for the first sub lens group G1a to satisfy conditional expression (3) below:

$$0.70 < |f1a/f| < 2.00 \qquad (3),\ \text{where}$$

f1a: the focal length of the first sub lens group, and
f: the focal length of the entire system when focusing on an object at infinity.

If the value of |f1a/f| is not more than the lower limit defined by conditional expression (3), negative refractive power of the first sub lens group G1a will be excessively increased and negative distortion will be too large. If the value of |f1a/f| is not less than the upper limit defined by conditional expression (3), field curvature will be increased and imaging performance in the entire imaging region will be deteriorated.

It is preferable for the first sub lens group G1a and the second sub lens group G1b to form a substantially afocal optical system. In such a case, these first and second sub lens groups G1a, G1b function as a wide converter, and the first lens group G1 can obtain positive refractive power having a desired strength without making positive refractive power of the following third sub lens group G1c so strong. Further, it will be easy for the aperture stop St to be disposed between the second sub lens group G1b and the third sub lens group G1c, a refractive power arrangement which has favorable symmetry with respect to the aperture stop St can be achieved in the super-wide angle lens system, and it will be easy to suppress off-axis aberration excellently.

It is preferable for the first sub lens group G1a and the second sub lens group G1b to satisfy conditional expression (4) below:

$$-0.50 < f/f1a+b < 0.20 \qquad (4),\ \text{where}$$

f1a+b: the combined focal length of the first sub lens group and the second sub lens group, and
f: the focal length of the entire system when focusing on an object at infinity.

If the value of f/f1a+b is not more than the lower limit defined by conditional expression (4), negative distortion will be excessively increased. Further, the optical system formed by combining the first sub lens group G1a and the second sub lens group G1b will have negative refractive power which is stronger than necessary, and thereby positive refractive power of the third sub lens group G1c has to be stronger. This, however, will lead to increased spherical aberration.

If the value of f/f1a+b is not less than the upper limit defined by conditional expression (4), the optical system formed by combining the first sub lens group G1a and the second sub lens group G1b will have positive refractive power which is stronger than necessary, and thereby negative refractive power of the constituent elements of the third sub lens group G1c will have to be stronger, for example, by decreasing the absolute value of a radius of curvature of a concave surface. In this case as well, spherical aberration will be increased.

It is preferable for the second sub lens group G1b to include two positive lenses. By the second sub lens group G1b including two positive lenses, positive refractive power required for the second sub lens group G1b, in which the height of an axial light ray is great and spherical aberration is likely to occur, can be shared between at least two positive lenses. This is advantageous from the viewpoint of excellent correction of spherical aberration.

Figure 2:
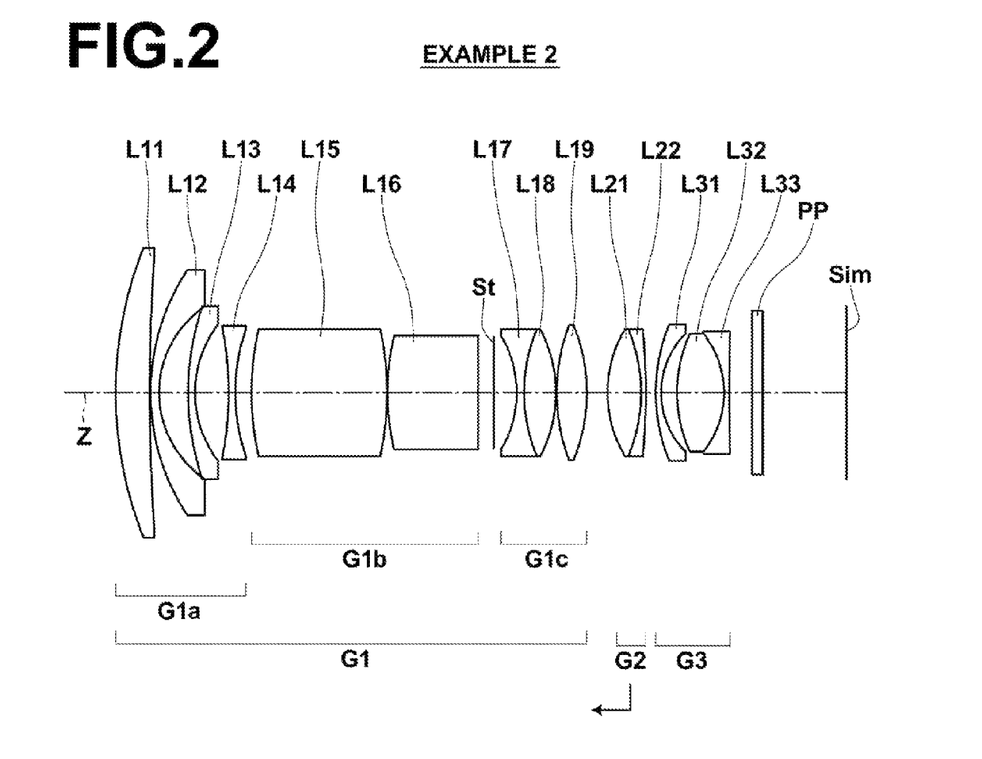
FIG. 2 is a cross-sectional view illustrating the lens configuration of a super-wide-angle lens according to Example 2 of the present invention.
Figure 4:
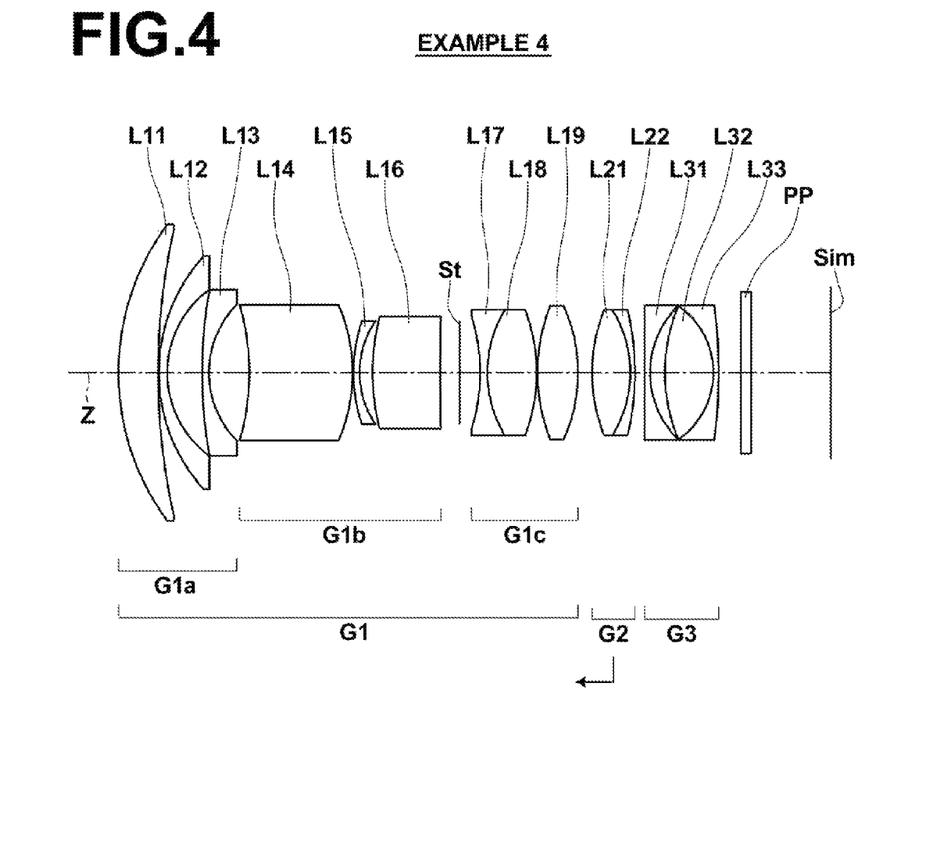
FIG. 4 is a cross-sectional view illustrating the lens configuration of a super-wide-angle lens according to Example 4 of the present invention.

The second sub lens group G1b may consist of only two positive lenses as shown in the example of FIG. 2 or may consist of three positive lenses as shown in the example of FIG. 1. Alternatively, the second sub lens group G1b may be constituted by three lenses in which a negative lens is disposed between two positive lenses as shown in the examples of FIGS. 3 and 4.

More particularly, the second sub lens group G1b shown in the example of FIG. 2 consists of a biconvex lens L21 and a positive meniscus lens L22 with a convex surface toward the object side in this order from the object side. The second sub lens group G1b shown in the example of FIG. 1 consists of a biconvex lens L21, a positive meniscus lens L22 with a convex surface toward the object side, and a positive meniscus lens L23 with a convex surface toward the object side in this order from the object side. The second sub lens group G1b shown in the examples of FIGS. 3 and 4 consists of a positive meniscus lens L21 with a convex surface toward the image side, a negative meniscus lens L22 with a convex surface toward the object side, and a positive meniscus lens L23 with a convex surface toward the object side in this order from the object side.

In the second sub lens group G1b, it is preferable for the center thickness of the most-object-side lens and the most-image-side lens to be respectively the thickest and the second thickest among the lenses of the entire system. This is advantageous from the viewpoint of correction of comatic aberration.

It is preferable for the second sub lens group G1b to satisfy conditional expression (5) below:

$$1.60 < f1b/f < 8.00 \qquad (5),\ \text{where}$$

f1b: the focal length of the second sub lens group, and
f: the focal length of the entire system when focusing on an object at infinity.

If the value of f1b/f is not more than the lower limit defined by conditional expression (5), positive refractive power of the second sub lens group G1b will be excessively strong, and thereby negative refractive power of the first sub lens group G1a has to be strong in order to cancel out the occurrence of spherical aberration which tends to be insufficiently corrected (under corrected). This, however, will increase distortion.

If the value of f1b/f is not less than the upper limit defined by conditional expression (5), positive refractive power of the second sub lens group G1b will be weak, and thereby the amount of occurrence of spherical aberration will be reduced, which makes it impossible to cancel out spherical aberration that occurs in the first sub lens group G1a, which tends to be excessively corrected (over corrected). In order to avoid this shortcoming, negative refractive power of the first sub lens group G1a also has to be weaker. This, however, will increase field curvature.

It is preferable for the third sub lens group G1c to substantially consist of a cemented lens formed by cementing a negative lens with a concave surface toward the object side and a positive lens together, and a biconvex lens in this order from the object side. By making the most-object-side surface of the third sub lens group G1c a concave surface, a light ray height can be temporarily made high and a back focus having an appropriate length can be secured. Further, the positive lens that constitutes the cemented lens and the biconvex lens administer a converging effect on off-axis light rays that enter the second lens group G2 in a state where an angle formed by the off-axis light rays and the optical axis Z is smaller. Thereby, fluctuations in the angle of view while focusing can be suppressed. Moreover, by disposing the cemented lens immediately adjacent to the aperture stop St toward the image side thereof, longitudinal chromatic aberration can be excellently corrected.

For example, the third sub lens group G1b in the example of FIG. 1 substantially consists of a cemented lens formed by cementing a biconcave lens L8 and a biconvex lens L9 together, and a biconvex lens L10 in this order from the object side.

It is preferable for the third sub lens group G1c to satisfy conditional expression (6) below:

$$1.70 < f1c/f < 5.00 \tag{6}$$

where f1c: the focal length of the third sub lens group, and
f: the focal length of the entire system when focusing on an object at infinity.

If the value of f1c/f is not more than the lower limit defined by conditional expression (6), spherical aberration will be insufficiently corrected. In order to solve this problem, the number of constituent elements of the third sub lens group G1c is required to be increased. This, however, will cause the second lens group G2 which is a focusing group to move away from the aperture stop St, thereby inevitably increasing the weight of the lens due to increase in the effective diameter of the second lens group G2.

If the value of f1c/f is not less than the upper limit defined by conditional expression (6), positive refractive power of the third sub lens group G1c will be weak, and thereby the refractive power of the first sub lens group G1a and the second sub lens group G1b that function as a wide converter will have to be stronger in order to maintain a predetermined amount of refractive power of the entire first lens group G1. This, however, will make distortion and the like worse and imaging performance will deteriorate.

It is preferable for the second lens group G2 to substantially consist of a set of a cemented lens formed by cementing a positive lens and a negative lens together. By configuring a focusing group in such a manner, reduction in weight can be achieved, and fluctuations in aberrations while focusing can be advantageously suppressed.

It is preferable for the third lens group G3 to include, in this order from the object side, a negative lens having a concave surface toward the image side, of which the absolute value of the radius of curvature of the image side surface is smaller than that of the object side surface, and a cemented lens formed by cementing a biconvex lens and a negative lens together. As the third lens group G3 has a negative lens having a concave surface toward the image side, of which the absolute value of the radius of curvature of the image side surface is smaller than that of the object side surface, a large divergence characteristic is obtained, which is advantageous from the viewpoint of excellently correcting field curvature. This negative lens may be a negative meniscus lens or a biconcave lens. Moreover, a configuration in which a cemented lens is disposed in the vicinity of the image surface Sim is advantageous from the viewpoint of excellently correcting lateral chromatic aberration. The negative lens which constitutes this cemented lens may be a biconcave lens or a negative meniscus lens.

For example, the third lens group G3 shown in the example of FIG. 1 substantially consists of a negative meniscus lens L31 with a concave surface toward the image side and a cemented lens formed by cementing a biconvex lens L32 and biconcave lens L33 together, in this order from the object side. The third lens group G3 shown in the example of FIG. 4 substantially consists of a biconcave lens L31 and a cemented lens formed by cementing a biconvex lens L32 and a negative meniscus lens L33 with a convex surface toward the image side together, in this order from the object side.

In the third lens group G3, it is preferable for conditional expression (7) below to be satisfied:

$$-15.0 < f3/f < -2.00 \tag{7}$$

f3: the focal length of the third lens group, and
f: the focal length of the entire system when focusing on an object at infinity.

If the value of f3/f is not more than the lower limit defined by conditional expression (7), the third lens group G3 will have insufficient negative refractive power, and thereby distortion and field curvature will become more prominent. If the value of f3/f is not less than the upper limit defined by conditional expression (7), negative refractive power of the third lens group G3 will be excessive, and thereby it will be difficult for field curvature to be excellently maintained.

Under the above circumstances, it is preferable for conditional expressions (1') through (7') below to be respectively satisfied, instead of conditional expressions (1) through (7):

$$0.20 < f1/f2 < 0.50 \tag{1'}$$

$$3.0 < f2/f < 6.0 \tag{2'}$$

$$0.80 < |f1a/f| < 1.80 \tag{3'}$$

$$-0.40 < f/f1a+b < 0.10 \tag{4'}$$

$$1.80 < f1b/f < 7.50 \tag{5'}$$

$$1.90 < f1c/f < 4.00 \tag{6'}$$

$$-12.0 < f3/f < -3.00 \tag{7'}$$

In the super-wide-angle lens of the present embodiment, it is preferable for the full angle of view to be not less than 80 degrees. According to the super-wide-angle lens of the present embodiment, by adopting the above configurations as appropriate, a small F-number and higher performance can be achieved, a reduction in weight of the focusing group can be realized, and fluctuations in aberrations and fluctuations in the angle of view while focusing can be suppressed in a super-wide-angle lens system having the full angle of view which is not less than 80 degrees.

Next, specific Examples of the super-wide-angle lens of the present invention will be described.

Example 1

FIG. 1 shows the lens configuration of the super-wide-angle lens of Example 1. The manner in which the drawing is shown has been given above, and accordingly redundant descriptions thereof will be omitted.

The super-wide-angle lens of Example 1 is schematically configured as shown below. That is, the super-wide-angle lens consists of a first lens group G1 having positive refractive power, a second lens group G2 having positive refractive power, and a third lens group G3 having negative refractive power in this order from the object; the first lens group G1 consists of a first sub lens group G1a having negative refractive power, a second sub lens group G1b having positive refractive power, an aperture stop St, and a third sub lens group G1c having positive refractive power in this order from the object side; the first lens group G1 and the third lens group G3 are fixed while focusing; and the second lens group G2 moves toward the object side while focusing from an object at infinity to an object at the closest distance.

The lenses that constitute each lens group are configured as described below. The first sub lens group G1a consists of lenses L11 through L14, the second sub lens group G1b consists of lenses L15 through L17, and the third sub lens group G1c consists of lenses L18 through L20. The second lens group G2 consists of lenses L21 and L22. The third lens group G3 consists of lenses L31 through L33.

The lens data of the super-wide angle lens of Example 1 is shown in Table 1. Items in the column Si show the i-th (i=1, 2, 3, . . . ) surface number, the value of i sequentially increasing from the surface on the object side of the constituent element at the most-object side, which is designated as 1, toward the image side. Items in the column Ri show the radius of curvature of the i-th surface (i=1, 2, 3, . . . ), and items in the column Di show the distances between i-th surfaces and (i+1)st surfaces along the optical axis Z. Note that the sign of the radius of curvature is positive in the case that a surface shape is convex on the object side, and negative in the case that the surface shape is convex on the image side.

Further, items in the column Ndj show the refractive index of a j-th (j=1, 2, 3, . . . ) optical element with respect to the d-line (wavelength: 587.56 nm), the value of j sequentially increasing from the constituent element at the most object side, which is designated as 1, toward the image side. Items in the column vdj show the Abbe number of the j-th optical element with respect to the d-line. Note that the lens data also shows an aperture stop St and an optical member PP. Further, the column of the surface number of a surface corresponding to the aperture stop St indicates a surface number and the letters (St). The column of the surface number of a surface corresponding to the image surface indicates a surface number and the letters (IMG).

The symbol "f" which is indicated below the text "Example 1" in Table 1 refers to the focal length of the entire system when focusing on an object at infinity, the symbol "FNo." refers to a F-number, and the symbol "2ω" refers to the full angle of view. The values shown in Table 1 are in a case of focusing on an object at infinity and are normalized such that the focal length of the entire system when focusing on an object at infinity becomes 1.000, which are related to the d-line. Further, the numerical values of each Table shown below are rounded to a predetermined number of digits.

TABLE 1

Example 1
f = 1.000, FNo. = 2.1, 2ω = 89.6°

| Si | Ri | Di | Ndj | vdj |
|---|---|---|---|---|
| 1 | 5.600183 | 0.4042 | 1.51633 | 64.14 |
| 2 | 35.792879 | 0.0085 | | |
| 3 | 2.403558 | 0.1024 | 1.85026 | 32.27 |
| 4 | 1.239689 | 0.3099 | | |
| 5 | 3.025693 | 0.0808 | 1.84666 | 23.78 |
| 6 | 1.273261 | 0.3711 | | |
| 7 | −4.445421 | 0.0808 | 1.62041 | 60.29 |
| 8 | 2.332049 | 0.1228 | | |
| 9 | 4.107706 | 1.7626 | 1.68893 | 31.07 |
| 10 | −3.702201 | 0.1561 | | |
| 11 | 2.194150 | 0.0737 | 1.48749 | 70.23 |
| 12 | 3.552393 | 0.1561 | | |
| 13 | 4.578686 | 0.6465 | 1.51633 | 64.14 |
| 14 | 2147.483648 | 0.1888 | | |
| 15(St) | ∞ | 0.2694 | | |
| 16 | −1.391491 | 0.0885 | 1.80400 | 46.57 |
| 17 | 2.044073 | 0.3734 | 1.62004 | 36.26 |
| 18 | −1.630268 | 0.0108 | | |
| 19 | 2.215166 | 0.3220 | 1.49700 | 81.54 |
| 20 | −2.265067 | 0.3568 | | |
| 21 | 1.399844 | 0.3988 | 1.49700 | 81.54 |
| 22 | −2.071879 | 0.0566 | 1.83400 | 37.16 |
| 23 | −12.803637 | 0.1183 | | |
| 24 | 2.237745 | 0.0637 | 1.80518 | 25.42 |
| 25 | 0.975693 | 0.0931 | | |
| 26 | 1.642177 | 0.5306 | 1.58913 | 61.14 |
| 27 | −1.072960 | 0.0636 | 1.80440 | 39.59 |
| 28 | 133.449185 | 0.2694 | | |
| 29 | ∞ | 0.1239 | 1.51633 | 64.14 |
| 30 | ∞ | 0.9819 | | |
| 31(IMG) | ∞ | | | |

Figure 5:
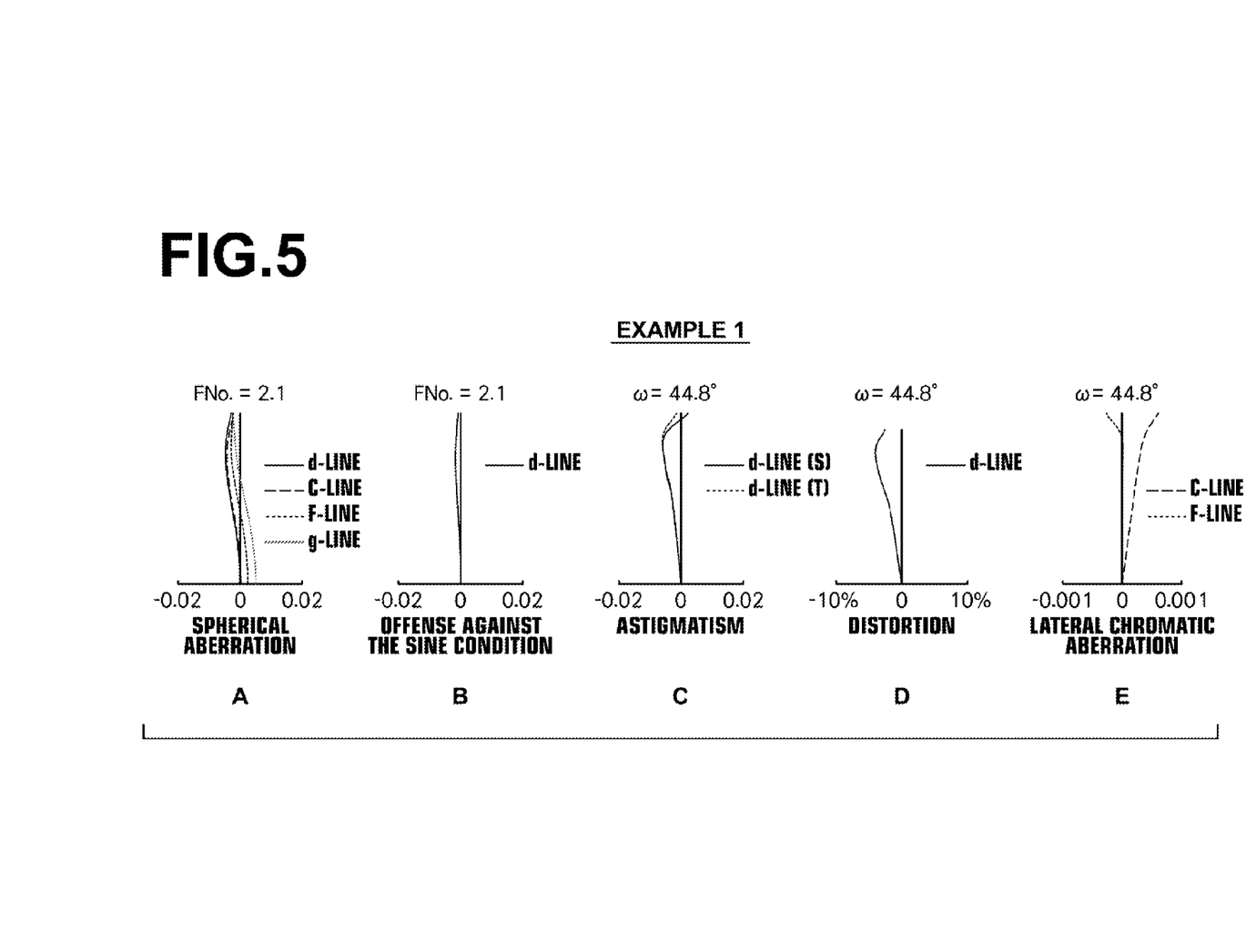

A through E of FIG. 5 respectively are aberration diagrams of spherical aberration, offense against the sine condition, astigmatism, distortion, and lateral chromatic aberration of the super-wide-angle lens of Example 1 when focusing on an object at infinity. These aberration diagrams are in the case that the focal length of the entire system when focusing on an object at infinity is normalized to be 1.000.

Each aberration diagram is with respect to the d-line (wavelength: 587.56 nm), but the spherical aberration diagram also illustrates aberrations with respect to the g-line (wavelength: 435.84 nm), the F-line (wavelength: 486.13 nm) and C-line (wavelength: 656.27 nm), and the lateral chromatic aberration diagram illustrates aberrations with respect to the F-line and the C-line. In the astigmatism diagram, the solid line illustrates astigmatism in the sagittal direction while the dotted line illustrates astigmatism in the tangential direction. FNo. in the spherical aberration and the offense against the sine condition diagrams represents the F-number and ω in the other aberration diagrams represents the half angle of view.

Values corresponding to conditional expressions (1) through (7) of the super-wide-angle lens of Example 1 are shown with those of the other Examples in Table 5 to be shown below.

The points regarding the symbols that represent each item of data, the meanings thereof, the manners in which they are shown, that each item of data is that for when focusing on an object at infinity; and that the numerical values are normalized such that the focal distance of the entire system at the wide angle end is 1.000 apply to the Examples to be described below, unless otherwise noted. Accordingly, redundant descriptions thereof will be omitted.

Example 2

FIG. 2 is a lens configuration diagram of the super-wide-angle lens of Example 2. The schematic configuration of the super-wide-angle lens of Example 2 is the same as that of Example 1.

However, in the super-wide-angle lens of Example 2, the first sub lens group G1a consists of lenses L11 through L14, the second sub lens group G1b consists of lenses L15 and L16, the third sub lens group G1c consists of lenses L17 through L19, the second lens group G2 consists of lenses L21 and L22, and the third lens group G3 consists of lenses L31 through L33.

Figure 6:
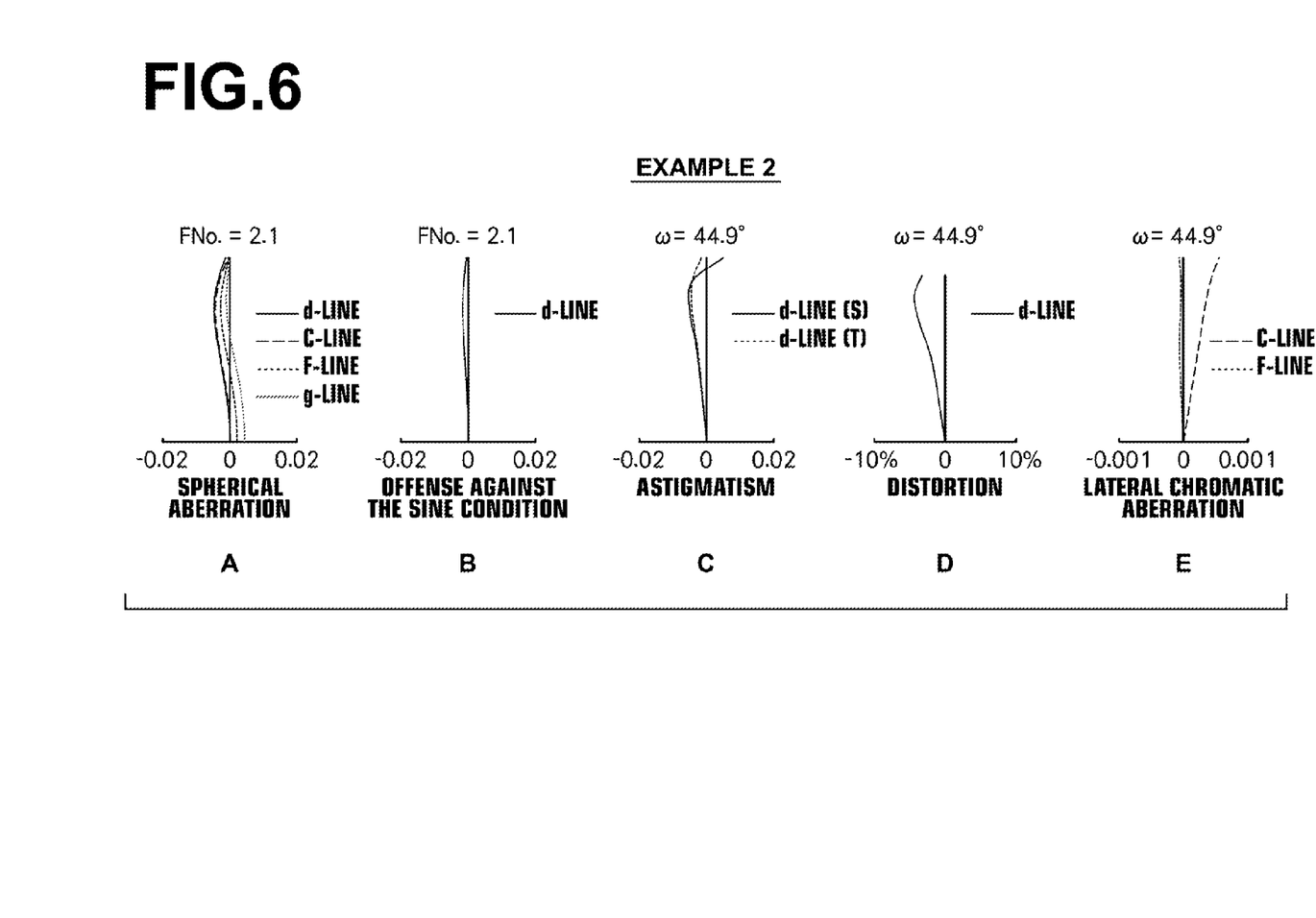

Table 2 shows lens data of the super-wide-angle lens of Example 2. A through E of FIG. 6 respectively show aberration diagrams of the super-wide-angle lens of Example 2.

TABLE 2

Example 2
f = 1.000, FNo. = 2.1, 2ω = 89.8°

| Si | Ri | Di | Ndj | vdj |
|---|---|---|---|---|
| 1 | 4.622146 | 0.4030 | 1.51633 | 64.14 |
| 2 | 25.029559 | 0.0084 | | |
| 3 | 2.630475 | 0.1019 | 1.85026 | 32.27 |
| 4 | 1.233731 | 0.3431 | | |
| 5 | 3.194344 | 0.0805 | 1.84666 | 23.78 |
| 6 | 1.326958 | 0.3979 | | |
| 7 | −3.938820 | 0.0795 | 1.62041 | 60.29 |
| 8 | 2.318824 | 0.1910 | | |
| 9 | 3.459006 | 1.5999 | 1.68893 | 31.07 |
| 10 | −3.564142 | 0.0057 | | |
| 11 | 2.895620 | 1.0725 | 1.51633 | 64.14 |
| 12 | 166.167256 | 0.1866 | | |

TABLE 2-continued

Example 2
f = 1.000, FNo. = 2.1, 2ω = 89.8°

| Si | Ri | Di | Ndj | vdj |
|---|---|---|---|---|
| 13(St) | ∞ | 0.2682 | | |
| 14 | −1.317196 | 0.0881 | 1.80400 | 46.57 |
| 15 | 1.958414 | 0.3748 | 1.62004 | 36.26 |
| 16 | −1.621444 | 0.0107 | | |
| 17 | 2.272425 | 0.3561 | 1.49700 | 81.54 |
| 18 | −2.082538 | 0.2427 | | |
| 19 | 1.460255 | 0.3969 | 1.49700 | 81.54 |
| 20 | −1.953801 | 0.0563 | 1.83400 | 37.16 |
| 21 | −7.637814 | 0.1178 | | |
| 22 | 2.109841 | 0.0634 | 1.80518 | 25.42 |
| 23 | 0.987146 | 0.1874 | | |
| 24 | 1.656203 | 0.5556 | 1.58913 | 61.14 |
| 25 | −1.120389 | 0.0633 | 1.80440 | 39.59 |
| 26 | 30.296732 | 0.2682 | | |
| 27 | ∞ | 0.1234 | 1.51633 | 64.14 |
| 28 | ∞ | 0.9933 | | |
| 29(IMG) | ∞ | | | |

Example 3

FIG. 3 is a lens configuration diagram of the super-wide-angle lens of Example 3. The schematic configuration of the super-wide-angle lens of Example 3 is the same as that of Example 1.

However, in the super-wide-angle lens of Example 3, the first sub lens group G1a consists of lenses L11 through L13, the second sub lens group G1b consists of lenses L14 through L16, the third sub lens group G1c consists of lenses L17 through L19, the second lens group G2 consists of lenses L21 and L22, and the third lens group G3 consists of lenses L31 through L33.

Figure 7:
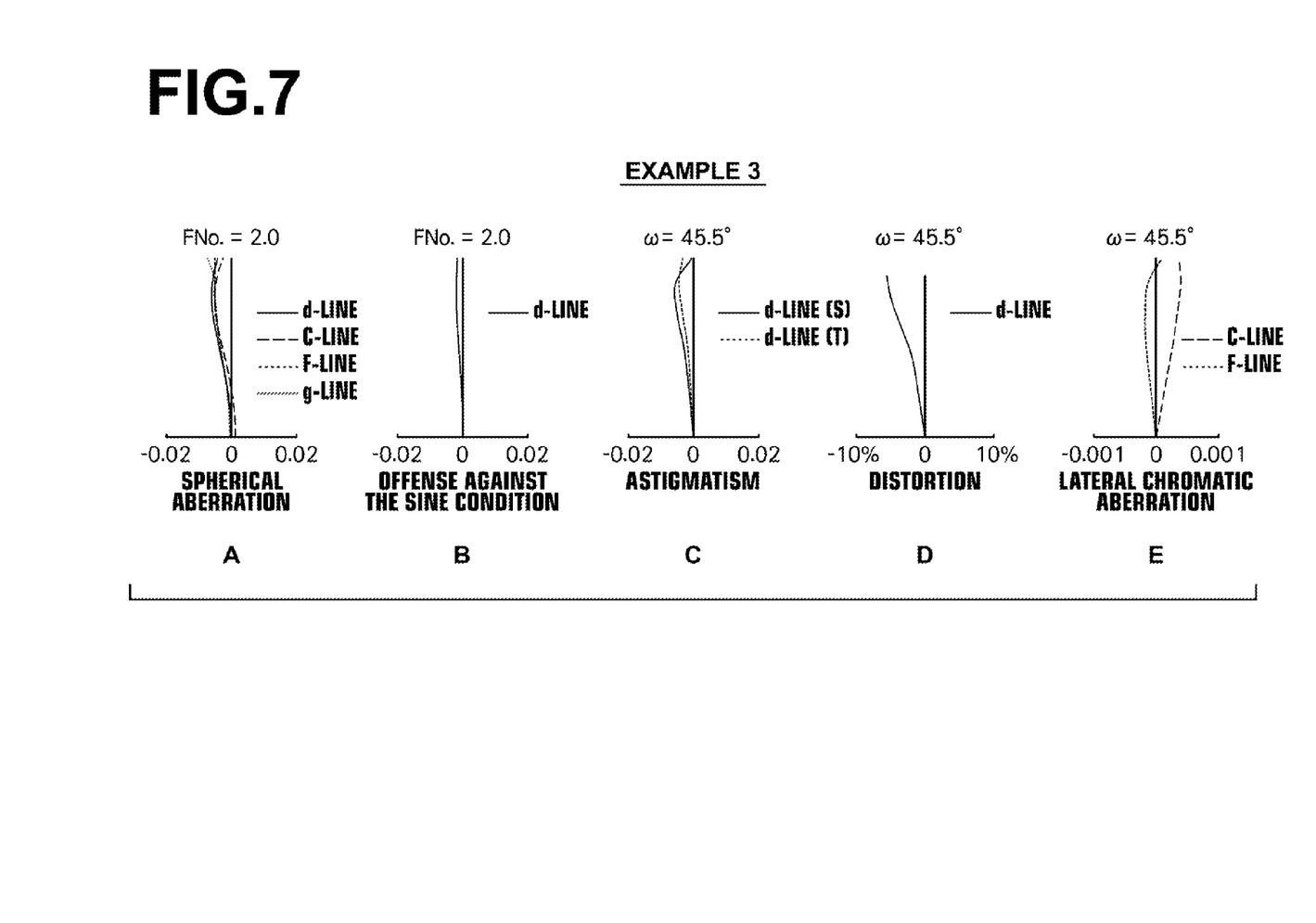

Table 3 shows lens data of the super-wide-angle lens of Example 3. A through E of FIG. 7 respectively show aberration diagrams of the super-wide-angle lens of Example 3.

TABLE 3

Example 3
f = 1.000, FNo. = 2.0, 2ω = 91.0°

| Si | Ri | Di | Ndj | vdj |
|---|---|---|---|---|
| 1 | 3.306968 | 0.4315 | 1.78800 | 47.37 |
| 2 | 7.647596 | 0.0084 | | |
| 3 | 2.768525 | 0.1014 | 1.62041 | 60.29 |
| 4 | 1.227372 | 0.4262 | | |
| 5 | 5.607810 | 0.0800 | 1.84666 | 23.78 |
| 6 | 1.188096 | 0.4781 | | |
| 7 | −2.756411 | 1.2274 | 1.48749 | 70.23 |
| 8 | −2.185790 | 0.0112 | | |
| 9 | 1.775367 | 0.0730 | 1.60738 | 56.81 |
| 10 | 1.109011 | 0.1545 | | |
| 11 | 2.372777 | 0.8005 | 1.69895 | 30.13 |
| 12 | 52.532386 | 0.2285 | | |
| 13(St) | ∞ | 0.2431 | | |
| 14 | −2.648723 | 0.0751 | 1.80400 | 46.57 |
| 15 | 1.395202 | 0.4398 | 1.66680 | 33.05 |
| 16 | −3.343522 | 0.0427 | | |
| 17 | 2.839179 | 0.4160 | 1.49700 | 81.54 |
| 18 | −1.627656 | 0.2135 | | |
| 19 | 2.122874 | 0.4002 | 1.49700 | 81.54 |
| 20 | −1.590514 | 0.0374 | 1.67270 | 32.10 |
| 21 | −8.934843 | 0.1172 | | |
| 22 | 2.345081 | 0.0560 | 1.80440 | 39.59 |
| 23 | 1.229240 | 0.2091 | | |
| 24 | 2.272133 | 0.5870 | 1.58913 | 61.14 |
| 25 | −1.047162 | 0.0560 | 1.72825 | 28.46 |
| 26 | −9.462240 | 0.2668 | | |
| 27 | ∞ | 0.1227 | 1.51633 | 64.00 |

TABLE 3-continued

Example 3
f = 1.000, FNo. = 2.0, 2ω = 91.0°

| Si | Ri | Di | Ndj | vdj |
|---|---|---|---|---|
| 28 | ∞ | 1.1605 | | |
| 29(IMG) | ∞ | | | |

Example 4

FIG. 4 is a lens configuration diagram of the super-wide-angle lens of Example 4. The schematic configuration of the super-wide-angle lens of Example 4 is the same as that of Example 1.

However, in the super-wide-angle lens of Example 4, the first sub lens group G1a consists of lenses L11 through L13, the second sub lens group G1b consists of lenses L14 through L16, the third sub lens group G1c consists of lenses L17 through L19, the second lens group G2 consists of lenses L21 and L22, and the third lens group G3 consists of lenses L31 through L33.

Figure 8:
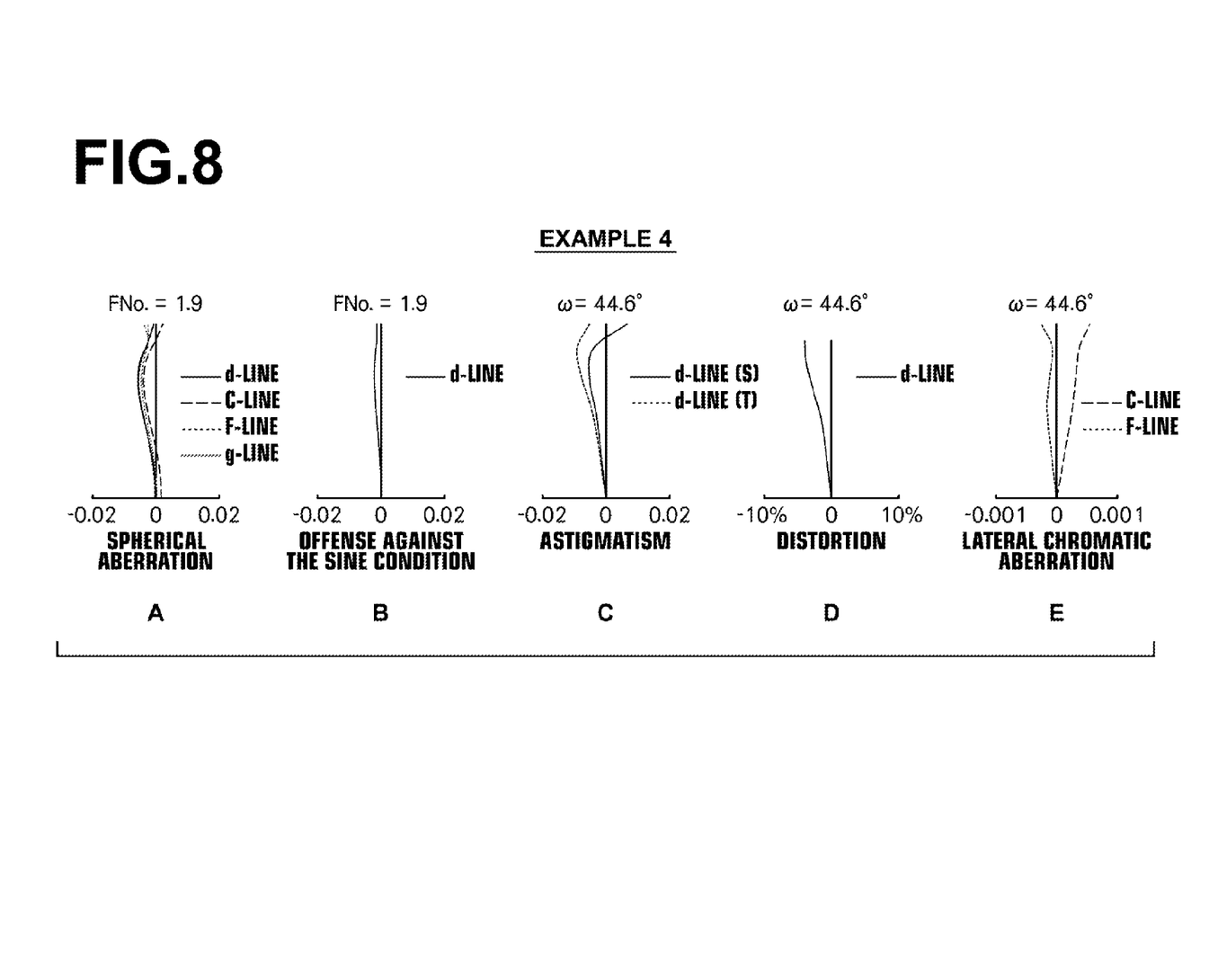

Table 4 shows lens data of the super-wide-angle lens of Example 4. A through E of FIG. 8 respectively show aberration diagrams of the super-wide-angle lens of Example 4.

TABLE 4

Example 4
f = 1.000, FNo. = 1.9, 2ω = 89.2°

| Si | Ri | Di | Ndj | vdj |
|---|---|---|---|---|
| 1 | 2.920064 | 0.4627 | 1.59551 | 39.24 |
| 2 | 7.618538 | 0.0083 | | |
| 3 | 2.027837 | 0.0999 | 1.58913 | 61.14 |
| 4 | 1.207400 | 0.4094 | | |
| 5 | 5.588599 | 0.0788 | 1.84666 | 23.78 |
| 6 | 1.133350 | 0.4730 | | |
| 7 | −2.822154 | 1.2088 | 1.48749 | 70.23 |
| 8 | −1.985425 | 0.0110 | | |
| 9 | 1.892770 | 0.0719 | 1.58313 | 59.38 |
| 10 | 1.079113 | 0.1522 | | |
| 11 | 2.679099 | 0.7939 | 1.72825 | 28.46 |
| 12 | 52.850150 | 0.2274 | | |
| 13(St) | ∞ | 0.2365 | | |
| 14 | −2.264440 | 0.0863 | 1.80400 | 46.57 |
| 15 | 1.433702 | 0.5781 | 1.65412 | 39.68 |
| 16 | −2.043813 | 0.0105 | | |
| 17 | 2.159277 | 0.4727 | 1.49700 | 81.54 |
| 18 | −1.896817 | 0.1653 | | |
| 19 | 1.985530 | 0.4467 | 1.49700 | 81.54 |
| 20 | −1.388557 | 0.0552 | 1.80400 | 46.57 |
| 21 | −3.147575 | 0.1154 | | |
| 22 | −104.787839 | 0.0621 | 1.63980 | 34.46 |
| 23 | 1.093986 | 0.1719 | | |
| 24 | 1.983428 | 0.5685 | 1.58913 | 61.14 |
| 25 | −0.951036 | 0.0621 | 1.72825 | 28.46 |
| 26 | −6.017448 | 0.2628 | | |
| 27 | ∞ | 0.1188 | 1.51633 | 64.14 |
| 28 | ∞ | 0.9329 | | |
| 29(IMG) | ∞ | | | |

Table 5 shows values corresponding to conditional expressions (1) through (7) of Examples 1 through 4 above. Note that the values shown in Table 5 are based on the d-line.

TABLE 5

| Conditional Expressions | | Example 1 | Example 2 | Example 3 | Example 4 |
|---|---|---|---|---|---|
| (1) | f1/f2 | 0.3487 | 0.4011 | 0.2986 | 0.3140 |
| (2) | f2/f | 3.7519 | 3.5435 | 4.9770 | 3.5493 |

TABLE 5-continued

| Conditional Expressions | | Example 1 | Example 2 | Example 3 | Example 4 |
|---|---|---|---|---|---|
| (3) | \|f1a/f\| | 0.8768 | 0.8415 | 1.5272 | 1.6816 |
| (4) | f/f1a + b | 0.0277 | −0.0007 | −0.24 | −0.27 |
| (5) | f1b/f | 2.1350 | 2.0042 | 5.5999 | 6.7000 |
| (6) | f1c/f | 3.2942 | 3.3821 | 2.7790 | 2.0808 |
| (7) | f3/f | −3.2829 | −3.5618 | −11.0561 | −3.4232 |

Figure 9:
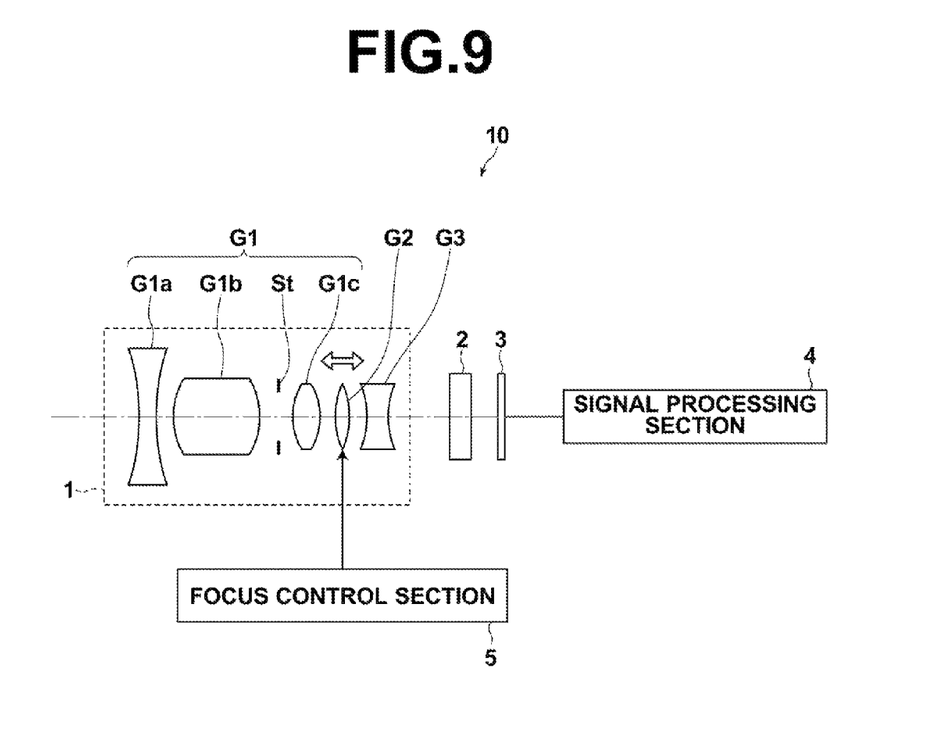
FIG. 9 is a schematic configuration of an imaging apparatus according to one embodiment of the present invention.

Next, an imaging apparatus according to an embodiment of the present invention will be described with reference to FIG. 9. FIG. 9 shows a schematic configuration diagram of the imaging apparatus 10 including the super-wide-angle lens 1 according to the embodiment of the present invention as one example of the imaging apparatus of the embodiment of the present invention. Examples of the imaging apparatus include a film camera, a digital camera, a broadcasting camera, a movie camera, and the like, for example. The super-wide-angle lens according to the present embodiment can be applied as an exchangeable lens for such cameras, for example.

The imaging apparatus 10 shown in FIG. 9 includes a super-wide-angle lens 1; a filter 2, which is disposed on the image side of the super-wide-angle lens 1; an imaging element 3 which captures an image of a subject formed by the super-wide-angle lens 1; a signal processing section 4 which computes a signal output from the imaging element 3; and a focus control section 5. The super-wide-angle lens 1 includes a first lens group G1, a second lens group G2, and a third lens group G3. The first lens group G1 consists of a first sub lens group G1a, a second sub lens group G1b, an aperture stop St, and a third sub lens group G1c. Note that FIG. 9 conceptually shows each of the lens groups.

The imaging element 3 captures an image of a subject formed by the super-wide-angle lens 1 and converts the image into an electric signal. The imaging element 3 is disposed such that the imaging surface thereof matches the image surface of the super-wide-angle lens 1. A CCD (Charge Coupled Device), a CMOS (Complementary Metal Oxide Semiconductor), or the like may be employed as the imaging element 3, for example. The imaging apparatus 10 is configured such that focusing is performed by moving the second lens group G2 in the direction of the optical axis by the focus control section 5 when the object distance is changed.

The present invention has been described with reference to the Embodiments and Examples. The present invention is not limited to the embodiments and the examples described above, and various modifications are possible. For example, values, such as the radius of curvature, the distances between surfaces, the refractive indices, the Abbe numbers of each lens, and the like are not limited to the values in the numerical examples shown in the Tables, but may be other values.

What is claimed is:

1. A super-wide-angle lens substantially consisting of three lens groups which are a first lens group having positive refractive power, a second lens group having refractive power, and a third lens group having negative refractive power arranged in this order from the object side;
   the first lens group and the third lens group are fixed and the second lens group moves toward the object side while focusing from an object at infinity to an object at the closest distance;
   the first lens group substantially consists of a first sub lens group having negative refractive power, a second sub lens group having positive refractive power, an aperture stop, and a third sub lens group having positive refractive power in this order from the object side;
   the second lens group is composed of a cemented lens formed by cementing a positive lens and a negative lens together; and
   conditional expressions (1) and (2) are satisfied:

$$0.15 < f1/f2 < 0.60 \tag{1}$$

$$2.5 < f2/f < 7.0 \tag{2}, \text{where}$$

f1: the focal length of the first lens group,
f2: the focal length of the second lens group, and
f: the focal length of the entire system when focusing on an object at infinity.

2. The super-wide-angle lens of claim 1, wherein conditional expression (1') is satisfied:

$$0.20 < f1/f2 < 0.50 \tag{1'}$$

3. The super-wide-angle lens of claim 1, wherein conditional expression (2') is satisfied:

$$3.0 < f2/f < 6.0 \tag{2'}$$

4. The super-wide-angle lens of claim 1, wherein the first sub lens group includes a positive meniscus lens and two negative meniscus lenses, and conditional expression (3) below is satisfied:

$$0.70 < |f1a/f| < 2.00 \tag{3}, \text{where}$$

f1a: the focal length of the first sub lens group.

5. The super-wide-angle lens of claim 4, wherein conditional expression (3) below:

$$0.80 < |f1a/f1| < 1.80 \tag{3'}$$

6. The super-wide-angle lens of claim 1, wherein conditional expression (4) is satisfied:

$$-0.50 < f/f1a+b < 0.20 \tag{4}, \text{where}$$

f1a+b: the combined focal length of the first sub lens group and the second sub lens group.

7. The super-wide-angle lens of claim 6, wherein conditional expression (4') is satisfied:

$$-0.40 < f/f1a+b < 0.10 \tag{4'}$$

8. The super-wide-angle lens of claim 1, wherein the second sub lens group includes two positive lenses and conditional expression (5) below is satisfied:

$$1.60 < f1b/f < 8.00 \tag{5}, \text{where}$$

f1b: the focal length of the second sub lens group.

9. The super-wide-angle lens of claim 8, wherein conditional expression (5') below is satisfied:

$$1.80 < f1b/f < 7.50 \tag{5'}$$

10. The super-wide-angle lens of claim 1, wherein the third sub lens group substantially consists of a cemented lens formed by cementing a negative lens with a concave surface toward the object side and a positive lens together, and a biconvex lens in this order from the object side; and conditional expression (6) below is satisfied:

$$1.70 < f1c/f < 5.00 \tag{6}, \text{where}$$

f1c: the focal length of the third sub lens group.

11. The super-wide-angle lens of claim 10, wherein conditional expression (6') is satisfied:

$$1.90 < f1c/f < 4.00 \tag{6'}$$

12. The super-wide-angle lens of claim 1, wherein the third lens group includes, in this order from the object side, a negative lens having a concave surface toward the image side, of which the absolute value of the radius of curvature of the image side surface is smaller than that of the object side surface, and a cemented lens formed by cementing a biconvex lens and a negative lens together; and conditional expression (7) below is satisfied:

$$-15.0 < f3/f < -2.00 \qquad (7),$$

where f3: the focal length of the third lens group.

13. The super-wide-angle lens of claim 12, wherein conditional expression (7') is satisfied:

$$-12.0 < f3/f < -3.00 \qquad (7').$$

14. An imaging apparatus comprising the super-wide-angle lens of claim 1.

\* \* \* \* \*